United States Patent [19]

Linton et al.

[11] 3,713,114

[45] Jan. 23, 1973

[54] DATA REGENERATION SCHEME FOR STORED CHARGE STORAGE CELL

[75] Inventors: Richard H. Linton; George Sonoda, both of Poughkeepsie, N.Y.

[73] Assignee: International Business Machines Corporation, Armonk, N.Y.

[22] Filed: Dec. 18, 1969

[21] Appl. No.: 886,277

[52] U.S. Cl. ........340/173 R, 340/172.5, 340/173 FF

[51] Int. Cl. ..............................................G11c 11/40

[58] Field of Search.......340/173 FF, 137 R, 173 CA

[56] References Cited

UNITED STATES PATENTS

| | | | |
|---|---|---|---|
| 3,387,286 | 6/1968 | Dennard | 340/173 |
| 3,111,649 | 11/1963 | Carroll | 340/173 |
| 2,823,368 | 2/1958 | Avery | 340/173 |
| 3,541,530 | 11/1970 | Spaminato | 340/173 |
| 3,576,571 | 4/1971 | Booher | 340/173 |

*Primary Examiner*—Terrell W. Fears
*Attorney*—Hanifin and Jancin and James E. Murray

[57] ABSTRACT

This specification discloses a scheme for regenerating the data in stored charge storage cells of monolithic memories. The scheme involves periodic reading out of the data in the stored charge storage cells and temporarily storing the data in the capacitance of an address line for the storage cell. Thereafter the data on the address line is written back into the cell.

7 Claims, 2 Drawing Figures

INVENTORS
RICHARD H LINTON
GEORGE SONODA

BY James E Murray

ATTORNEY

DATA REGENERATION SCHEME FOR STORED CHARGE STORAGE CELL

BACKGROUND OF THE INVENTION

This invention relates to monolithic memories and more particularly to the regeneration of data in stored charge storage cells as opposed to bistable storage cells.

Copending application Ser. No. 853,353 filed Aug. 27, 1969 now U.S. Pat. No. 3,585,613 entitled "Field Effect Transistor Capacitor Storage Cell" discloses a storage cell which stores data in the form of electrical charge on an interelectrode capacitance of a first field effect transistor and is addressed for reading and writing through two other field effect transistors. These addressing field effect transistors are biased off while the cell is not being addressed for reading and writing so that the charge stored in the interelectrode capacitance field effect transistor will have to be dissipated through the off impedances of the addressing field effect transistors. However, no matter how high these off impedances are, in time the charge will be dissipated and the data stored will be lost in this type of storage cell. To overcome this characteristic of a stored charge type storage cell it is necessary therefore that the data in the storage cell be periodically regenerated or in other words the electrical charge be restored at sufficiently short intervals to be sure that the data stored in the storage cell will not be lost due to leakage. It has been suggested that regeneration be accomplished by performing complete sequential read and write cycles, that is, the charge in the cell be restored by reading the data stored in the cell out through the sense amplifier of the memory into the memory registers and then rewriting the data back into the memory with the bit and word drivers. This of course ties up the sense amplifiers and registers of the memory for a considerable time in which they could be more advantageously employed in accessing the memory to perform machine functions.

BRIEF DESCRIPTION OF THE INVENTION

In accordance with the present invention regenerating data in stored charge storage cells is performed within the memory matrix. Periodically data is read out of the storage cell onto an address line of the storage cell and there used to form a write pulse for writing the data back into the storage cell to complete the regeneration.

Therefore it is an object of the present invention to provide a regenerating scheme for a stored charge storage cell;

It is another object of the invention to provide a faster operating stored charge storage cell; and It is a further object of the invention to provide a stored charge storage cell that employs the interelectrode capacitances of the addressing wires for the cell in regenerating the data in the cell.

DESCRIPTION OF THE DRAWINGS

These and other objects, features and advantages of the invention will be apparent from the following more particular description of the preferred embodiment of the invention as illustrated in the accompanying drawings of which.

DESCRIPTION OF AN EMBODIMENT OF THE INVENTION

Figure 1:
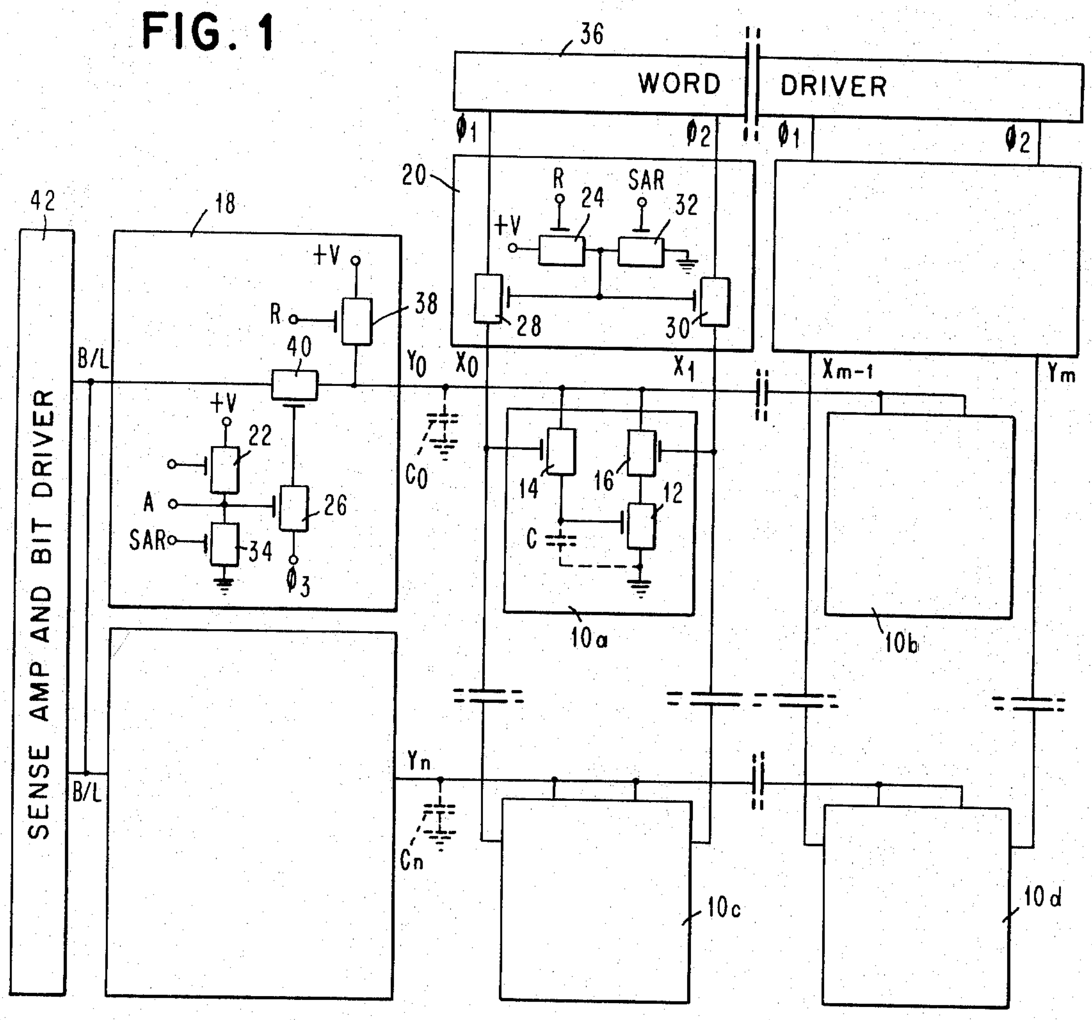
FIG. 1 is a monolithic memory fabricated in accordance with the present invention.
Figure 2:
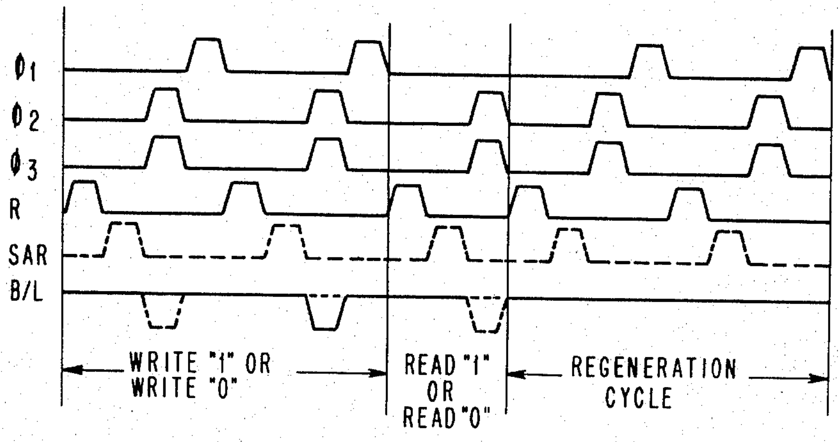
FIG. 2 is a graph of potentials employed in accessing the storage cells of the monolithic memory shown in FIG. 1.

FIG. 1 shows a memory in which the storage cells 10 are accessed by word lines $X_0$ through Xm and bit lines $Y_0$ to Yn. The cells are identical and are identically addressed in the matrix. Therefore, as shown for storage cell 10*a*, each storage cell is addressed by two word lines $X_0$ and $X_1$ and one bit line $Y_0$ and employs the capacitance C between the gating terminal and the source terminal of an insulated gate field effect transistor 12 as the storage element of the cell. When the capacitor C is discharged a binary "0" is stored in the cell and when the capacitor C is charged a binary "1" is stored in the cell.

The storage FET 12 is addressed by two addressing FET's 14 and 16. The FET 14 connecting the gate of FET 12 to the $Y_O$ bit line and the $X_O$ word line is the write FET for the storage cell while the FET 16 coupling the drain of FET 12 to the $Y_O$ bit line and the $X_1$ word line is the read FET.

While the cell is not being addressed for reading, writing or regeneration FET devices 14 and 16 are maintained off. This means the charge on capacitor C of the storage cell will be maintained there for a considerable time since the off impedances of devices 14 and 16 and the gate to drain and source impedances of device 12 are very high.

In addressing the memory for reading, writing or regeneration the proper bit and word decoders 18 and 20 are turned on to pass the $0_1$, $0_2$, $0_3$ and B/L pulses to a selected cell while the word and bit line decoders for unselected cells remain off to isolate those cells from the $0_1$, $0_2$, $0_3$ and B/L pulses. The turning on and off of decoders 18 and 20 is accomplished by the restore pulse R and the SAR pulse. First the restore pulse R is applied to the gates of devices 22 and 24 in all the decoders 18 and 20 to charge nodes A and B to bias FETS 26, 28 and 30 conductive to $0_1$, $0_2$ and $0_3$ pulses. Thereafter in the bit and word decoders 18 and 20 for the unselected cells a second transistor 32 or 34 is turned on by the SAR pulse to discharge the nodes A and B rendering the transistors 26, 28 and 30 in those decoders nonconductive to the $0_1$, $0_2$ or $0_3$ pulses thereby isolating the nonselected cells from the addressing sequences. In the decoders of the selected cells, say cell 10*a* no SAR pulse is applied to the gates of FETS 32 and 34. Thus in these decoders FETS 26, 28 and 30 remain turned on to the $0_1$, $0_2$ and $0_3$ pulses in the writing, reading or regeneration sequences.

In the write sequence, devices 16 and 40 are rendered conductive by the simultaneous application of $0_2$ and $0_3$ pulses to read out the data stored in the cell 10*a* while the complement of the data to be written into the cell is placed on the capacitor CO by the bit driver 42. Then the write FET 14 is rendered conductive by a $0_l$ pulse passing through the FET 28 from the word driver 36 of the memory. The $0_1$ pulse biases the write FET device 14 conductive thereby connecting the gate of storage device 12 to the $Y_O$ bit line. If the $Y_O$ line capacitance CO is charged when the $0_1$ pulse is applied to the $X_O$ word line there will be enough potential on the $Y_O$ bit line to charge the capacitor C through the device 14 to store a "1." If the capacitor CO is not charged at that time capacitor C will remain uncharged storing a "0" in the storage cell.

The potential on the capacitance $C_O$ is now restored by rendering device 38 conductive with the restore pulse R. A second read/write cycle of this type with the actual data to be stored placed on the bit line, will complete the writing of data into the cell. If a "1" is to be stored the bit line is held at ground potential during the first $0_3$ pulse and is held at +V during the second $0_3$ pulse. If a "O" is to be stored the BM line is held at +V during the first $0_3$ pulse and at ground during the second $0_3$ pulse. The remaining cells connected to the $Y_O$ and $X_1$ word lines will be regenerated during the write operation.

After each write cycle the charge on the capacitor CO is restored by rendering device 38 conductive to current from the +V source by the restore pulse R.

To read the data stored in the storage cell, the read transistor 16 is rendered conductive by a $0_2$ pulse applied to the X1 line through the word decoder 20 after the $Y_O$ line has been restored to charge capacitor $C_0$. If the capacitor C is charged at this time, device 12 will conduct shorting the $Y_O$ bit line to ground through devices 16 and 12. This discharges the line capacitance to ground potential and produces a pulse on the $Y_O$ bit line. If the capacitor C is not charged device 12 will not conduct so that a current path is not provided to ground through devices 12 and 16 when the $0_2$ pulse is applied to the X1 read word line. In this case, capacitor $C_O$ is not discharged and the potential on the $Y_O$ bit line remains substantially unchanged.

Simultaneously with the application of the $0_2$ pulse on the X1 line a $0_3$ pulse is applied to the drain of FET 26 causing device 40 to conduct. When device 40 conducts pulses produced on the YO bit line will be transmitted to the sense amplifier and bit driver 42. Therefore if a "1" is stored in the storage cell 10*a*, the pulse produced on the $Y_O$ sense line when the data is read will be detected as a stored "1" by the sense amplifier. If a "0" is stored in the cell 10*a*, the absence of the pulse on the $Y_O$ sense line when the data is read will be detected as a stored "0" by the sense amplifier. After a read cycle the charge on the capacitance $C_O$ is restored by a restore pulse which biases FET device 38 conductive. Storage cells 10 are not bistable but rely on storage of charge in the capacitance C. Thus, the charge on capacitance C will leak off in time causing the data in the storage cell to be lost if the charge is not somehow restored periodically. Restoration is accomplished by a regeneration cycle. In this regeneration cycle a $0_2$ pulse is first applied to the $X_1$ word line rendering device 16 conductive while the line capacitor $C_O$ is charged. If a "1" is stored in the cell device 12 will also be conductive shorting the capacitance CO to ground. This discharges the capacitance $C_O$ and thereby stores a "0" in the capacitance $C_0$. This "0" is then written back into the storage cell 10*a* by application of $0_1$ pulse to the $X_O$ line rendering FET device 14 conductive and discharging capacitor C to ground potential.

By successively reading the data out of the cell and writing the read out data back into the cell in this manner, the data stored in the cell is made the complement of the data in the cell prior to the successive read and write cycles. To return the data to its true form a second set of successive read and write cycles is performed. However the potential on the capacitance $C_O$ is first restored by rendering device 38 conductive with restore pulse R. Then device 16 is rendered conductive by a $0_2$ pulse applied to the $X_1$ bit line. Since a "0" is now stored, the capacitor C is not charged up and therefore device 12 will be nonconducting leaving the potential on the $Y_O$ sense line at its restored level. Thereafter when a $0_1$ pulse is applied to the $X_O$ word line and device 14 is rendered conductive the capacitor C is charged through device 14 to its up level storing a "1" in the cell.

It can be seen that two consecutive read/write cycles of the type described restores data in the cell 10*a* to its true value. If a "0" had initially been stored in the cell 10*a* of the two read/write cycles a "0" would still be stored in the cell.

Devices 22 and 34 and 24 and 32 form decoders. Devices 32 and 34 are shown being activated by an SAR pulse. Each of these devices 32 and 34 are representative of any number of devices coupled in shunt with it to perform the decoding function. If any one of these devices is conducting devices 26, 28, 30 will be rendered nonconducting. In this way the proper bit and word lines are selected for read, write and regeneration operations.

The memory here is a word oriented memory that is by selection of a $X_O$ and $X_1$ word lines a number of cells arranged in a word along the $X_O$ and $X_1$ word lines are accessed as described for cell 10*a* but only one of these cells is connected to the sense amplifier and bit driver during read or write cycles. All these cells go through the regeneration function simultaneously. In the case of the write function the data stored in the cell of course will depend on the data reaching the $Y_O$ to $Yn$ bit lines from the bit driver 18.

Each of the bit drivers 18 are identical except of course for the decoding circuit in that decoding devices 34 will have gates coupled to different inputs so that the bit lines can be individually selected. The same holds true for the word decoders 20. They too are identical except that the gates of devices 32 are connected to different inputs so that the word lines can be individually selected.

All the FET devices are in enhancement mode insulated gates field effect transistors. That is application of voltage to the gates of any one of these devices increases the conduction through the device.

Above we have described one embodiment of the invention. In this embodiment it can be seen that the data in the storage cells 10 can be regenerated reading the data out onto the bit line and storing it into the bit line capacitance $C_O$ and then writing the data back into the storage cell. With two such successive read/write cycles the data stored in the cell is regenerated. It should be understood that a number of modifications can be made in this basic idea without departing from the scope of this invention. For instance, in copending application Ser. No. 2,292, filed on Jan. 12, 1970 and entitled "Improved Data Regeneration Scheme for Stored Charge Storage Cell", now U.S. Pat. No. 3,623,603, the data is read out onto the bit line where it is stored in a dummy storage cell and thereafter read back into the original storage cell. In this way only one read/write cycle need be performed to regenerate the data.

Therefore, it should be understood by those skilled in the art that various changes in form and details may be made therein without departing from the spirit and scope of the invention.

What is claimed is:

1. In a matrix of stored charge memory cells each addressed by the selection of a plurality of lines out of a grid of addressing lines for the matrix, a data regeneration scheme for periodically restoring the data stored in the memory cell without reading data out of the matrix, comprising:
   - read means for reading the data stored in any given cell out onto one of the plurality of lines for addressing the cell;
   - storage means connected directly to said one of the plurality of lines for temporarily storing the data so read out on said one of said plurality of lines so that it can be later read back into the given storage cell; and
   - write means for writing the data stored in the storage means back into the given storage cell.

2. The memory matrix of claim 1 wherein the storage means includes:
   - the line capacitance of said one of said plurality of lines; and
   - restoration means for restoring the charge on said line capacitance after a regeneration cycle consisting of reading the data stored in said given cell onto the line capacitance and writing the data so stored on the line capacitance back into said given cell.

3. In a word oriented matrix of three semiconductor device memory cells with the first device storing data in the form of charge on one of its interelectrode capacitances and the other two devices coupling said first device to word and bit line means for addressing the particular cell, a data regeneration scheme for periodically restoring the data stored in the memory cell comprising:
   - read means coupled to the word line means for rendering one of said other two devices in a particular cell conductive to thereby read the data stored in any particular cell onto the bit line means for said particular cell;
   - storage means coupled to said bit line means for temporarily storing the data read out from the particular cell onto the bit line means, and
   - write means coupled to the word line means to render the second of the other two devices to write the data stored in the storage means back into said particular cell.

4. The memory cell of claim 3 wherein said storage means includes:
   - the line capacitance of said bit line means; and
   - restoration means for restoring the charge on said line capacitance after a regeneration cycle consisting of reading the data stored in the particular cell and writing the data as stored on the line capacitance back into the particular cell.

5. The memory matrix of claim 4 including means for accessing said read means, said write means and said restoration means to perform two regeneration cycles and to restore the charge on said line capacitance between said regeneration cycles.

6. The memory matrix of claim 3 wherein said three device cells includes:
   - one device storing the data in its interelectrode capacitance;
   - a second device for charging and discharging the charge on the interelectrode capacitance to write data into the three device cell; and
   - a third device for determining the charge stored on the interelectrode capacitance to read the data stored in the storage cell.

7. The memory matrix of claim 6 wherein said devices are field effect transistors.

* * * * *